(12) United States Patent
Chen et al.

(10) Patent No.: US 11,275,209 B2
(45) Date of Patent: Mar. 15, 2022

(54) SPLICING STRUCTURE, SPLICING TABLE, AND SPLICING AND FITTING DEVICE

(71) Applicants: BEIJING BOE CHATANI ELECTRONICS CO., LTD., Beijing (CN); BOE TECHNOLOGY GROUP CO., LTD., Beijing (CN)

(72) Inventors: Xiaokun Chen, Beijing (CN); Wei Sun, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 103 days.

(21) Appl. No.: 16/825,620

(22) Filed: Mar. 20, 2020

(65) Prior Publication Data

US 2021/0063643 A1 Mar. 4, 2021

(30) Foreign Application Priority Data

Aug. 30, 2019 (CN) .......................... 201910817138.3

(51) Int. Cl.
| | | |
|---|---|---|
| *B25B 11/00* | (2006.01) | |
| *G02B 6/00* | (2006.01) | |
| *B23P 19/00* | (2006.01) | |
| *G02B 6/255* | (2006.01) | |
| *B23P 19/10* | (2006.01) | |

(52) U.S. Cl.
CPC .......... *G02B 6/2555* (2013.01); *B23P 19/10* (2013.01); *B25B 11/005* (2013.01); *G02B 6/2553* (2013.01)

(58) Field of Classification Search
CPC ..... B23P 19/10; G02B 6/2555; G02B 6/2553; B25B 11/005; B25B 11/00; B25B 11/02
USPC ............................. 269/289 R, 291, 301–310
See application file for complete search history.

(56) References Cited

U.S. PATENT DOCUMENTS

| | | | | |
|---|---|---|---|---|
| 7,070,178 B2 * | 7/2006 | Van Der Toorn | ..... | H01L 21/687 269/289 R |
| 2002/0031323 A1 * | 3/2002 | Hattori | ...................... | G02B 6/25 385/137 |
| 2004/0264892 A1 * | 12/2004 | Arima | .................. | G02B 6/2555 385/97 |

* cited by examiner

*Primary Examiner* — Monica S Carter
*Assistant Examiner* — Sarah Akyaa Fordjour
(74) *Attorney, Agent, or Firm* — Brooks Kushman P.C.

(57) ABSTRACT

A splicing structure, a splicing table, and a splicing and fitting device are provided. The splicing structure includes: a splicing adjustment component, a splicing alignment component, and a splicing base. The splicing adjustment component and the splicing alignment component are connected to the splicing base; and the splicing adjustment component is configured to support at least two to-be-spliced pieces; the splicing alignment component is configured to align the at least two to-be-spliced pieces to a first reference site. The splicing adjustment component is further configured to drive at least one of two adjacent to-be-spliced pieces in the at least two to-be-spliced pieces to move relative to the first reference site, to enable the two adjacent to-be-spliced pieces to be close to or far away from each other.

16 Claims, 6 Drawing Sheets

SPLICING STRUCTURE, SPLICING TABLE, AND SPLICING AND FITTING DEVICE

CROSS-REFERENCE TO RELATED APPLICATION

This application claims priority to Chinese Patent Application No. 201910817138.3 filed on Aug. 30, 2019, which is incorporated herein by reference in its entirety.

TECHNICAL FIELD

The present disclosure relates to the technical field of product assembly, and in particular, the present disclosure relates to a splicing structure, a splicing table, and a splicing and fitting device.

BACKGROUND

A splicing course of a splicing device in the related art is usually fixed, a gap between spliced pieces cannot be adjusted, gap requirement between spliced pieces cannot be met, and compatibility of the splicing device is low. There is a certain initial error during a process of placing each to-be-spliced piece on the splicing device before splicing, which will affect a distance between each to-be-spliced piece and an adjacent to-be-spliced piece during splicing, that is, gaps between spliced pieces are different, and integrity of an entire spliced product is affected.

SUMMARY

In view of the above, the present disclosure proposes a splicing structure, a splicing table, and a splicing and fitting device, which are used to solve technical problems in the related art that gap between spliced pieces is not adjustable or splicing accuracy is unstable with respect to a splicing device.

In a first aspect, an embodiment of the present disclosure provides a splicing structure, including: a splicing adjustment component, a splicing alignment component, and a splicing base; wherein the splicing adjustment component and the splicing alignment component are respectively connected to the splicing base; the splicing adjustment component is configured to support at least two to-be-spliced pieces; the splicing alignment component is configured to align the at least two to-be-spliced pieces to a first reference site. The splicing adjustment component is further configured to drive at least one of two adjacent to-be-spliced pieces in the at least two to-be-spliced pieces to move relative to the first reference site, to enable the two adjacent to-be-spliced pieces to be close to or far away from each other.

In a second aspect, an embodiment of the present disclosure provides a splicing table, including: any splicing structure provided in the first aspect.

In a third aspect, an embodiment of the present disclosure provides a splicing and fitting device, including: a splicing table provided in the second aspect, and a fitting structure; the fitting structure includes: a fitting positioning component, a fitting clamp component, a fitting driving component and a bracket; the bracket includes a fixed bracket and a movable bracket; the fixed bracket is connected to the splicing base of the splicing structure; and the movable bracket is slidably connected to the fixed bracket; the fitting positioning component and the fitting clamp component are both connected to the movable bracket; the fitting positioning component is configured to correct a to-be-fitted piece to be in a second reference site, and the second reference site corresponds to the first reference site; the fitting clamp component is configured to immobilize the to-be-fitted piece relative to the fitting clamp component; and the fitting driving component is configured to drive the movable bracket to be close to or far away from the splicing table.

BRIEF DESCRIPTION OF THE DRAWINGS

The above and/or additional aspects and advantages of the present disclosure will become apparent and easy to understand from the following description of the embodiments in combination with the accompanying drawings, in which.

DETAILED DESCRIPTION

Figure 1:
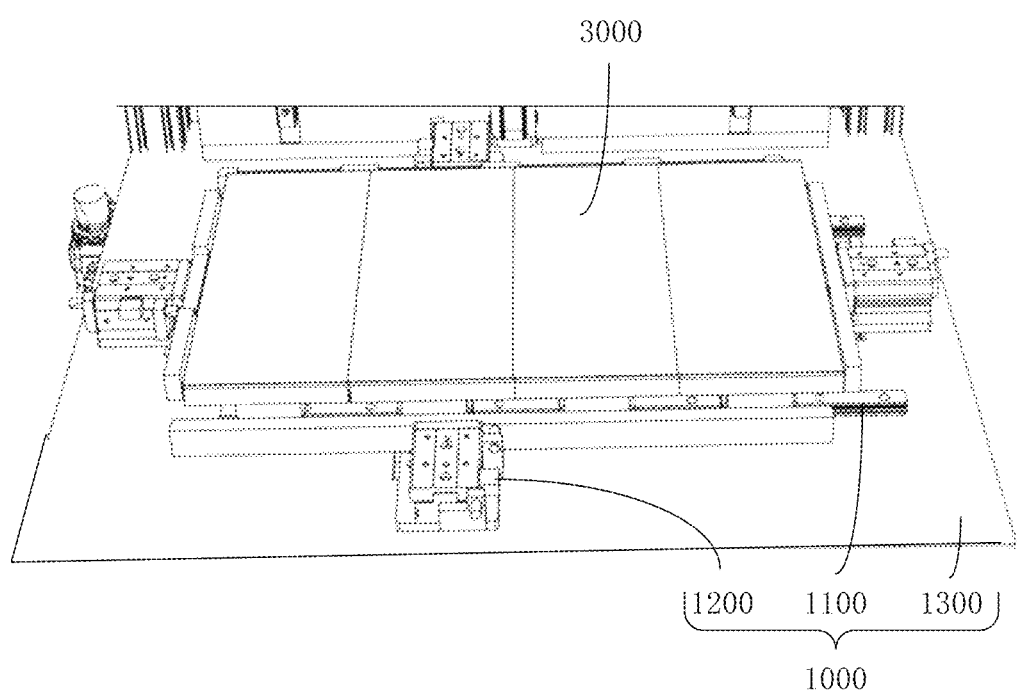
FIG. 1 is a schematic diagram of an operating state of a splicing structure provided by an embodiment of the present disclosure.

The present disclosure is described in detail below, and embodiments of the present disclosure are shown in the accompanying drawings, wherein same or similar reference numerals indicate same or similar parts or parts with same or similar functions throughout the description. In addition, when detailed descriptions of known technologies are unnecessary for features shown in the present disclosure, they may be omitted. The embodiments described below with reference to the accompanying drawings are exemplary, and are only used to explain the present disclosure, and cannot be construed as limiting the present disclosure.

Those skilled in the art can understand that, unless otherwise defined, terms (including technical and scientific terms) used herein have same meanings as that commonly understood by those of ordinary skill in the art to which this disclosure belongs. It should also be understood that terms, such as those defined in an ordinary dictionary, should be understood to have meanings consistent with those in context of the related art, and unless specifically defined herein, they will not be explained in an idealized or overly formal sense.

Those skilled in the art can understand that, unless expressly stated, singular forms "a", "an", "said" and "the" may also include plural forms. It should be further understood that the expression "including" used in the specification refers to presence of the features, integers, steps, operations, elements, and/or components, but does not exclude presence or addition of one or more other features, integers, steps, operations, elements, components, and/or a combination thereof. It should be understood that the term "and/or" used herein includes all or any unit of one or more associated listed items or any combination thereof.

In the related art, taking a mini Light-Emitting Diode (mini LED) backlight source as an example, relatively small-sized mini LED light boards are spliced to form a light-emitting surface of a large-sized mini LED backlight source, and specific to-be-spliced pieces can be the mini LED light boards. Different products have different requirements for the gap between spliced pieces, and a splicing device in the related art cannot meet different requirement for the size of the gap between spliced pieces. In addition, in the related art, an initial error of the splicing device before splicing results in sizes of the gaps between spliced pieces are different from each other. Specifically, the inventors of the present disclosure conducts research and finds that, taking the mini LED backlight source in a field of display technology as an example: due to large increase in a number of LED chips of mini LED and many technical difficulties in a transfer process, the light-emitting surface of the large-sized mini LED backlight source in the related art is mainly formed by splicing the relatively small-sized mini LED light boards. Because there must be the gap between spliced pieces, different products have different requirements for the gap between spliced pieces, and the splicing course of the splicing device in the related art is usually fixed, and a size of the gap between spliced pieces cannot be adjusted, and compatibility of the splicing device is low. In addition, there is a certain initial error during a process of placing each mini LED light board on the splicing device before splicing, which will affect a distance between each mini LED light board and an adjacent mini LED light board during splicing, that is, gaps between spliced pieces are different, and bright or dark stripes may be formed on a display module due to the gap between spliced pieces, which adversely affects display quality of the display module.

Therefore, it is necessary to solve problems that the gap between pieces spliced by the splicing device is not adjustable or splicing accuracy of the splicing device is unstable in the related art.

The splicing structure, the splicing table and the splicing and fitting device provided by the present disclosure are provided to solve the above technical problems of the related art.

The following specifically describes technical solutions of the present disclosure and how the technical solutions of the present disclosure solve the above technical problems with specific embodiments.

Figure 2:
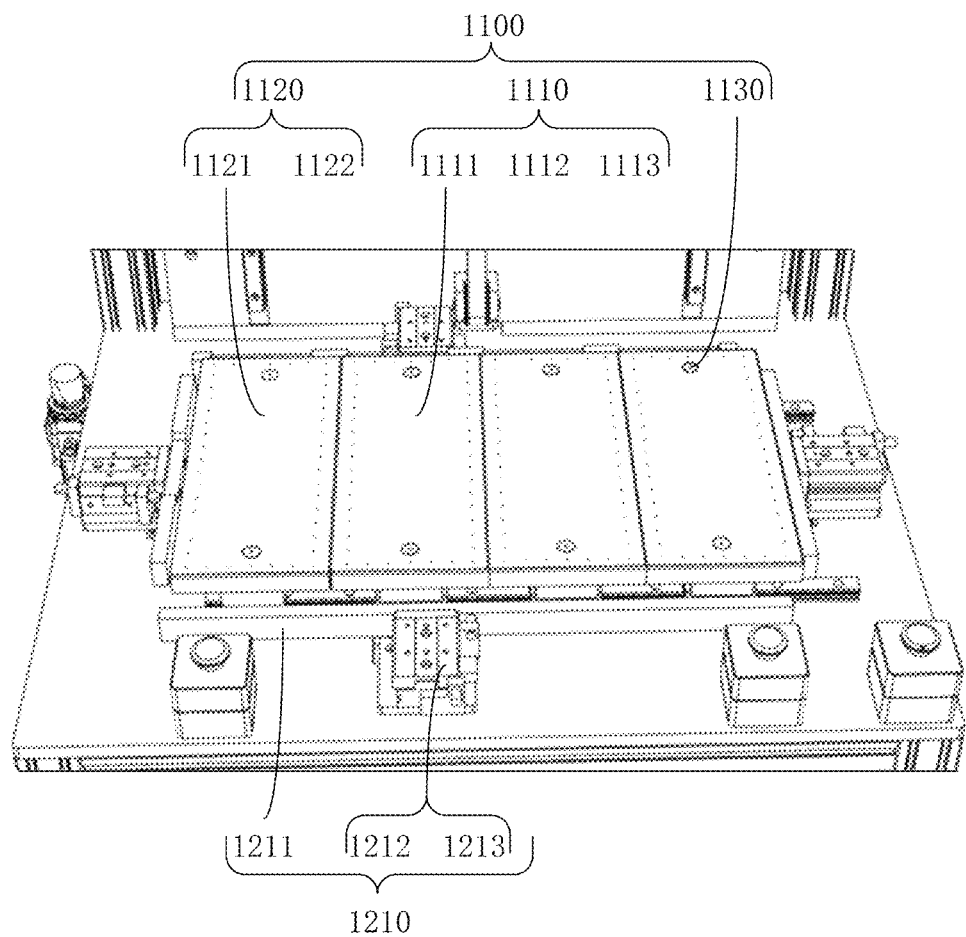
FIG. 2 is a schematic structural diagram of a splicing structure according to an embodiment of the present disclosure.

An embodiment of the present disclosure provides a splicing structure 1000, whose structural schematic diagram is shown in FIG. 1 and FIG. 2, including: a splicing adjustment component 1100, a splicing alignment component 1200, and a splicing base 1300; the splicing adjustment component 1100 and the splicing alignment component 1200 are respectively connected to the splicing base 1300; the splicing adjustment component 1100 is configured to support at least two to-be-spliced pieces 3000, and drive two adjacent to-be-spliced pieces 3000 to be close to or far away from each other; and the splicing alignment component 1200 is configured to align the to-be-spliced pieces 3000 to a first reference site. The splicing base 1300 provides a foundation for the entire splicing structure 1000, and facilitates arrangement of various components. The splicing adjustment component 1100 supports the to-be-spliced pieces 3000, and may adjust the gap between spliced pieces between the two adjacent to-be-spliced pieces 3000 by driving the two adjacent to-be-spliced pieces 3000 to be close to or far away from each other, to meet gap requirements of different products and improve compatibility of the splicing device. The splicing alignment component 1200 corrects an initial position of the to-be-spliced piece 3000 supported by the splicing alignment component 1200, so as to reduce the splicing error and maintain the splicing accuracy.

Optionally, the to-be-spliced piece 3000 is specifically a light board, such as a mini LED light board.

Optionally, during operation, at least two to-be-spliced pieces 3000 may be manually or mechanically placed one by one at respective positions on the splicing adjustment component 1100, the splicing alignment component 1200 operates to align the to-be-spliced pieces 3000 to the first reference site, and then the splicing adjustment component 1100 operates to adjust a size of the gap between the adjacent to-be-spliced pieces 3000.

The first reference site is an initial position alignment reference site of the to-be-spliced piece 3000, and the first reference site may correspond to a corresponding operation position of another process, for example, a fitting site of a fitting process, or a picking site of a picking process, and so on, to further achieve multi-process operations.

The inventors of the present disclosure consider that the structure of the splicing adjustment component 1100 needs to have a certain support strength and driving freedom, in order to provide sufficient support for the to-be-spliced pieces 3000 and to drive the two adjacent to-be-spliced pieces 3000 to be close to or far away from each other. For this reason, the present disclosure provides a following possible implementation for the splicing adjustment component 1100.

Figure 3:
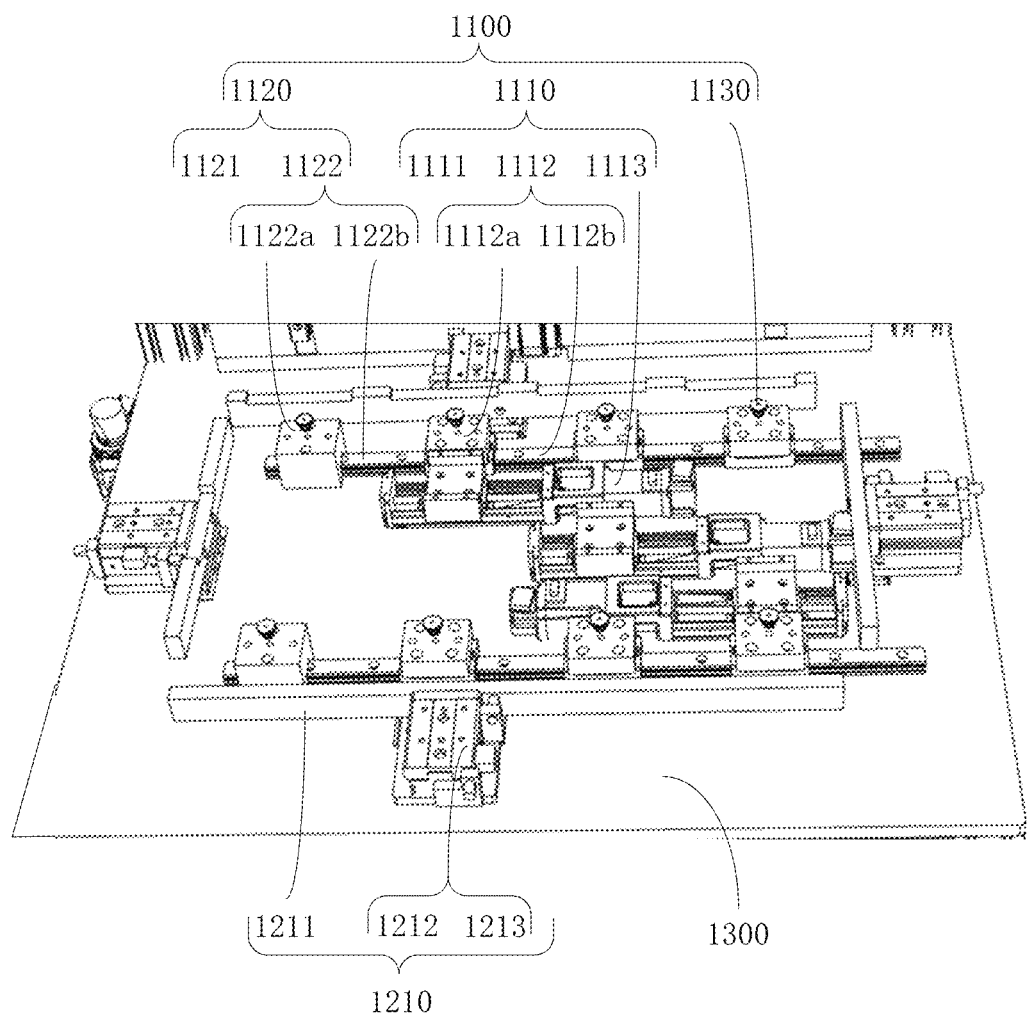
FIG. 3 is a schematic structural diagram of a splicing structure with a first support and a second support being removed according to an embodiment of the present disclosure.

As shown in FIG. 2 and FIG. 3, the splicing adjustment component 1100 in the embodiments of the present application includes several adjustment units 1110; and each adjustment unit 1110 includes a first support 1111, a first sliding support mechanism 1112, and an adjustment driving mechanism 1113; the first support 1111 is configured to support the to-be-spliced piece 3000; the first sliding support mechanism 1112 includes: a first slider 1112a and a first guide rail 1112b; the first slider 1112a and the first guide rail 1112b constitute a sliding connection pair, the first slider 1112a is fixedly connected to the first support 1111, and the first guide rail 1112b is fixedly connected to the splicing base 1300; and a movable part of the adjustment driving mechanism 1113 is drivingly connected to the first support 1111, and a fixed part of the adjustment driving mechanism 1113 is fixedly connected to the splicing base 1300.

Each adjustment unit 1110 may be configured to adjust a position of the corresponding to-be-spliced piece 3000, and the adjustment driving mechanism 1113 of each adjustment unit 1110 is driven independently, and a corresponding adjustment course occurs according to a relative position of the to-be-spliced piece 3000 and the first reference site, and it may meet size requirements of each gap to the greatest extent. The first sliding support mechanism 1112 of each adjustment unit 1110 adopts a combined structure of the first slider 1112a and the first guide rail 1112b. On one hand, it is used to support the corresponding first support 1111 and the to-be-spliced piece 3000 on the first support 1111; and on the other hand, it provides guidance for movement adjustment of the to-be-spliced piece 3000 relative to the first reference site, so as to ensure accuracy of the movement.

Optionally, the adjustment driving mechanism 1113 may adopt a driving mode such as an oil cylinder, an air cylinder, a chain drive, or a screw nut drive.

Optionally, in order to simplify a component structure and reduce costs, the first sliding support mechanisms 1112 of adjustment units 1110 may share a same guide rail, that is, the first slider 1112a and the corresponding first guide rail 1112b constitute a sliding connection pair.

The inventors of the present disclosure consider that, a process of adjusting the gap between the to-be-spliced pieces may be implemented by merely enabling the two adjacent to-be-spliced pieces 3000 to move relatively, that is, there may be at least one to-be-spliced piece 3000 that does not move during the process of adjusting the gap. For this reason, the present disclosure provides a following possible implementation for the splicing adjustment component 1100.

As shown in FIG. 2 and FIG. 3, the splicing adjustment component 1100 in the embodiments of the present disclosure may further include a reference unit 1120; and the reference unit 1120 is adjacent to the at least one adjustment unit 1110, and the reference unit 1120 is configured to support the to-be-spliced piece 3000 serving as a splicing reference.

The reference unit 1120 may be arranged at a designated position within the first reference site range, and each of the adjustment units 1110 moves relative to the reference unit 1120, so as to adjust the gap between a to-be-spliced piece 3000 and another to-be-spliced piece 3000 adjacent to the to-be-spliced piece 3000, and the reference unit 1120 need not be provided with a corresponding adjustment driving mechanism 1113 at least, which simplifies the component structure and reduces the costs.

Optionally, the adjustment units 1110 may be arranged in a circumferential direction of the area of the first reference site, with the reference unit 120 being a center; alternatively, the adjustment units 1110 may be arranged in an array. It should be appreciated that there may be multiple reference units 1120, which may be specifically set according to operation requirements.

The inventors of the present disclosure consider that if the reference unit 1120 has a certain movement capability, the to-be-spliced piece 3000 supported by the reference unit 1120 may also implement correction of an initial splicing site along with driving of the splicing alignment component 1200. For this reason, the present disclosure provides a following possible implementation for the splicing adjustment component 1100.

As shown in FIG. 2 and FIG. 3, the reference unit 1120 according to the embodiments of the present disclosure includes a second support 1121 and a second sliding support mechanism 1122. The second support 1121 is configured to support the to-be-spliced piece 3000 serving as the splicing reference; and the second sliding support mechanism 1122 includes: a second slider 1122a and a second guide rail 1122b; the second slider 1122a and the second guide rail 1122b constitute a sliding connection pair, the second slider 1122a is fixedly connected to the second support 1121, and the second guide rail 1122b is fixedly connected to the splicing base 1300.

The second sliding support mechanism 1122 of the reference unit 1120 adopts a combined structure of the second slider 1122a and the second guide rail 1122b. On one hand, it is used to support the corresponding second support 1121 and the to-be-spliced piece 3000 on the second support 1121, and on the other hand, it provides guidance for movement adjustment of the to-be-spliced piece 3000 relative to the first reference site, and ensures the accuracy of movement.

Optionally, in order to simplify the component structure and reduce costs, the reference unit 1120 may share a same guide rail with the adjustment unit 1110, that is, the second slider 1122a of the reference unit 1120 and the first guide rail 1112b constitute a sliding connection pair.

The inventors of the present disclosure consider that, during the movement of the adjustment unit 1110 or the reference unit 1120 of the splicing adjustment component 1100, the to-be-spliced piece 3000 supported by the first support 1111 or the second support 1121 might move relative to the support, if such movement occurs, a correction of the splicing alignment component 1200 will be ineffective, and the splicing accuracy will be adversely affected. For this reason, the present disclosure provides a following possible implementation for the splicing adjustment component 1100.

Figure 8:
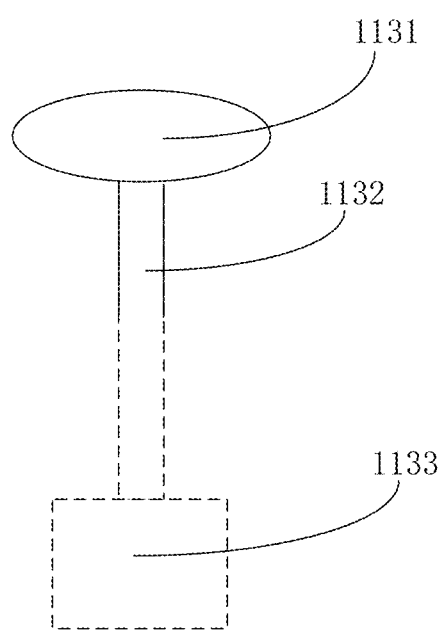
FIG. 8 is a schematic diagram of an adsorption device according to an embodiment of the present disclosure.

As shown in FIG. 2, FIG. 3, and FIG. 8, the splicing adjustment component 1100 according to the embodiments of the present disclosure further includes adsorption units 1130. The adsorption unit 1130 includes: a vacuum sucker 1131 and a vacuum tube 1132; the vacuum sucker 1131 is configured to immobilize the to-be-spliced piece 3000 relative to the vacuum sucker 1131; and the vacuum tube 1132 is configured to communicate the vacuum sucker 1131 with a vacuum source 1132. Each of the first slider 1112a and/or the second slider 1122a is provided with at least one vacuum sucker, and the first support 1111 and/or the second support 1121 is provided with a mounting through hole configured for accommodating the vacuum sucker; or the first support 1111 and/or the second support 1121 is provided with a mounting through hole configured for accommodating the vacuum sucker, and the vacuum sucker is arranged in the mounting through hole.

The adsorption unit 1130 is configured to strengthen fixation of the to-be-spliced piece 3000 relative to the corresponding support. Specifically, after being corrected by the splicing and alignment component 1200, the to-be-spliced piece 3000 is firmly adsorbed on the surface of the corresponding support through the vacuum sucker, to prevent movement of the to-be-spliced piece 3000 relative to the corresponding support during the gap adjustment process, thereby improving the stability of the splicing accuracy.

Optionally, the vacuum sucker may be disposed on the first slider 1112a and/or the second slider 1122a, or may be disposed within the mounting through hole of the first support 1111 and/or the second support 1121.

The inventors of the present disclosure consider that, during a process of correcting the to-be-spliced piece 3000 by the splicing alignment component 1200, in order to meet correction requirements for different directions, there may be more than one driving direction. For this reason, the present disclosure provides a following possible implementation for the splicing alignment component 1200.

Figure 4:
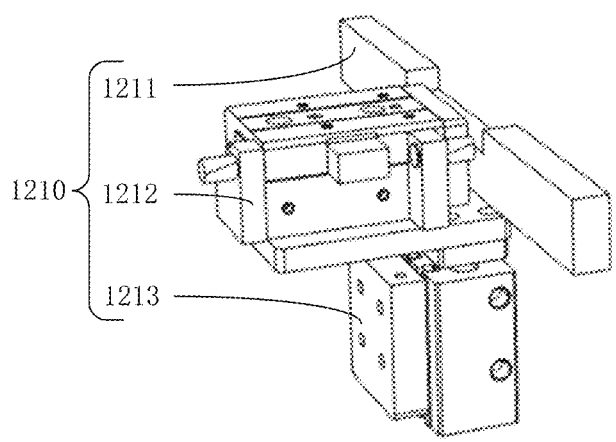
FIG. 4 is a schematic structural diagram of an alignment unit of a splicing structure according to an embodiment of the present disclosure.

As shown in FIG. 2, FIG. 3, and FIG. 4, the splicing alignment component 1200 according to the embodiments of the present disclosure includes alignment units 1210; each of the alignment units 1210 includes: an alignment plate 1211, a first alignment driving mechanism 1212, and a second alignment driving mechanism 1213; the alignment plates 1211 are arranged around the splicing adjustment component 1100; a fixed part of the first alignment driving mechanism 1212 is fixedly connected to the splicing base 1300, and a movable part of the first alignment driving mechanism 1212 is connected to the alignment plate 1211, to enable the alignment plate 1211 to be close to or far away from the to-be-spliced pieces 3000 along a first direction; and a fixed part of the second alignment driving mechanism 1213 is fixedly connected to the movable part of the first alignment driving mechanism 1212, and a movable part of the second alignment driving mechanism 1213 is fixedly connected to the alignment plate 1211, to enable the alignment plate 1211 to be aligned to the first reference site along a second direction. Optionally, the first direction and the second direction may be different directions, for example, the first direction is perpendicular to the second direction.

Under the driving of the first alignment driving mechanism 1212 and the second alignment driving mechanism 1213, the alignment plate 1211 pushes the to-be-spliced piece 3000 to move toward a target direction until it reaches the first reference site. By using the alignment plate 1211 to enable correction of the to-be-spliced piece 3000 in a pushing manner, as compared with a clamping manner, it may prevent the to-be-spliced piece 3000 such as the mini LED light board from being damaged due to the clamping process, and protects the special to-be-spliced piece 3000.

Optionally, the splicing alignment component 1200 may include two groups of alignment units 1210 arranged orthogonally around the to-be-spliced piece 3000, and each group of the alignment units 1210 includes at least two alignment units 1210 arranged opposite to each other. With such a structure, any movement of the to-be-spliced piece 3000 in a two-dimensional plane may be achieved.

Optionally, the first alignment driving mechanism 1212 and the second alignment driving mechanism 1213 may both adopt slide cylinders, such as HLS series (model HLS8X10AS) provided by AirTAC. A combination of the two slide cylinders enables the alignment plate 1211 to achieve two-dimensional movement, such as horizontal movement and vertical movement in the plane, that is, the first alignment driving mechanism 1212 and the second alignment driving mechanism 1213 may enable the up and down movement and the horizontal movement of the alignment plate 1211. Horizontal movement of the alignment plate 1211 is beneficial to push and align the to-be-spliced piece 3000 to the first reference site, and the up and down movement of the alignment plate 1211 may enable the alignment plate 1211 to move below the first support 1111 and/or the second support 1121 before the splicing operation or after the splicing operation, thereby reducing interference of placing the to-be-spliced piece onto the first support 1111 and/or the second support 1121, and reducing interference to subsequent operations (such as a fitting operation).

Based on the same inventive concept, an embodiment of the present disclosure provides a splicing table, which includes any one of the splicing structures 1000 provided in the above embodiments.

Figure 5:
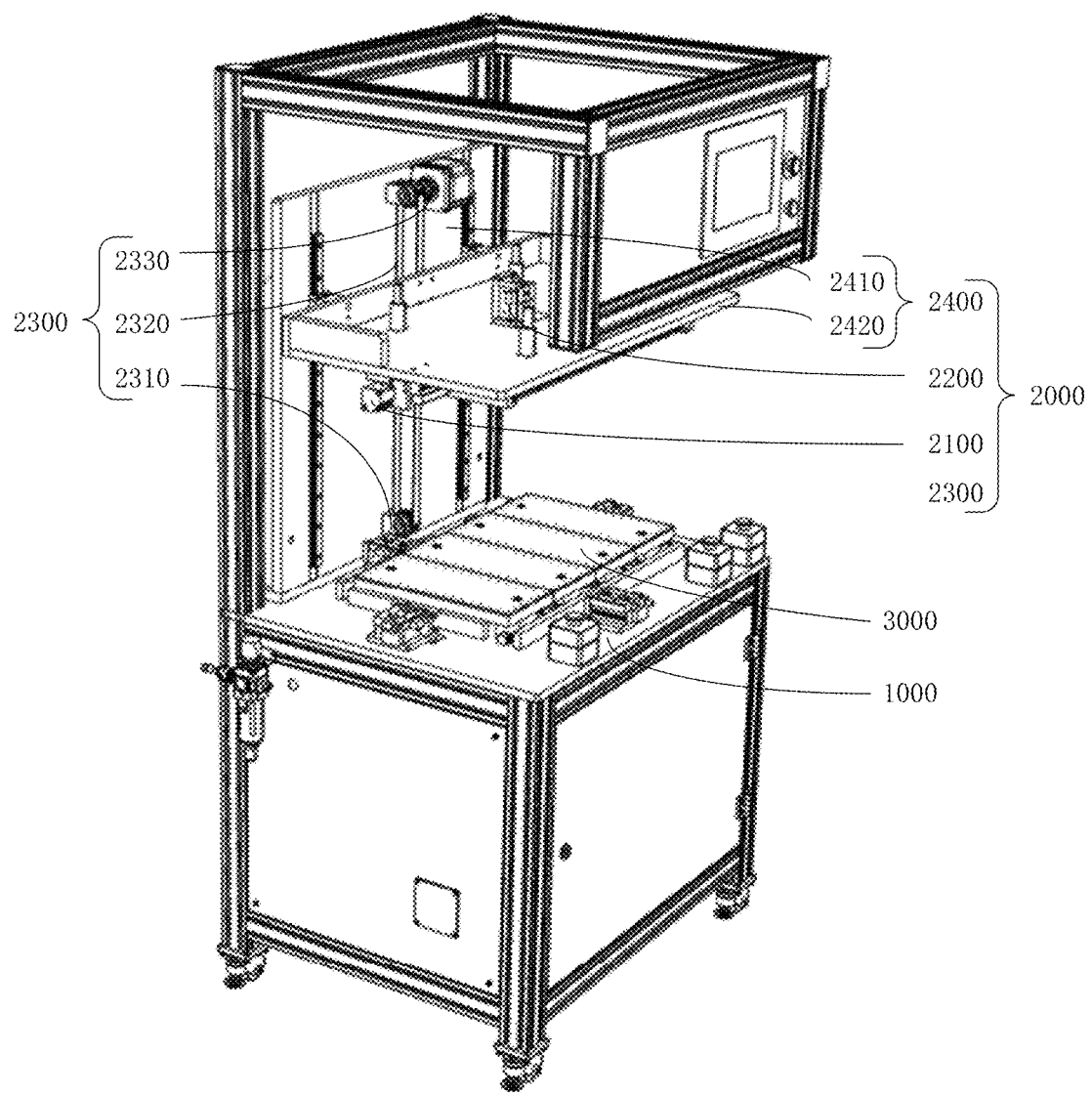
FIG. 5 is a schematic structural diagram of a splicing and fitting device according to an embodiment of the present disclosure.

Based on the same inventive concept, an embodiment of the present disclosure provides a splicing and fitting device, a structural schematic diagram of the splicing and fitting device is shown in FIG. 5, and the splicing and fitting device includes: a splicing table provided by the above embodiments, and a fitting structure 2000; the fitting structure 2000 includes: a fitting positioning component 2100, a fitting clamp component 2200, a fitting driving component 2300, and a bracket 2400; the bracket 2400 includes a fixed bracket 2410 and a movable bracket 2420; the fixed bracket 2410 is connected to the splicing base 1300 of the splicing structure 1000; and the movable bracket 2420 is slidably connected to the fixed bracket 2410; the fitting positioning component 2100 and the fitting clamp component 2200 are both connected to the movable bracket 2420; the fitting positioning component 2100 is configured to correct a to-be-fitted piece 4000 to be in a second reference site, and the second reference site corresponds to the first reference site; the fitting clamp component 2200 is configured to immobilize the to-be-fitted piece 4000 relative to the fitting clamp component 2200; and the fitting driving component 2300 is configured to drive the movable bracket 2420 to be close to or far away from the splicing table.

The bracket 2400 adopts a combined structure of the fixed bracket 2410 and the movable bracket 2420, which facilitates the fitting operation, and the movable bracket 2420 and the fixed bracket 2410 are slidably connected. The sliding connection mode of the guide rail may be selected to provide stable guidance for a fitting action, and to ensure fitting accuracy. The fitting positioning component 2100 is configured to correct an initial position of the to-be-fitted piece 4000 to reduce an error during fitting. The fitting clamp component 2200 is configured to immobilize the to-be-fitted piece 4000 relative to the fitting clamp component 2200 to ensure accuracy during fitting. The fitting drive component 2300 is configured to drive the to-be-fitted piece 4000 to complete the fitting operation, and cooperate with guidance of sliding connection between the movable bracket 2420 and the fixed support 2410 to ensure stability of the fitting accuracy.

Optionally, the to-be-fitted piece 4000 is specifically a back plate, such as a back plate of a mini LED light board in a mini LED display device.

Optionally, during operation, the to-be-fitted piece 4000 may be manually or mechanically placed onto the fitting positioning component 2100 to perform initial position correction before fitting; then, the fitting clamp component 2200 operates to hold the to-be-fitted piece 4000 corrected to the second reference site, at this time, the fitting and positioning component 2100 gives way to provide space for subsequent fitting; then, the fitting driving component 2300 operates to move both the movable bracket 2420 and the fitting clamp component 2200 on the movable bracket 2420 to be close to the splicing table, to achieve the fitting of the to-be-fitted piece 4000 and the spliced piece that has been spliced on the splicing table. After the fitting is completed, the fitting driving component 2300 drives the movable bracket 2420 to move backward and return to the initial position, preparing for the next fitting operation.

The inventors of the present disclosure consider that the fitting positioning component 2100 needs to correct the initial position of the to-be-fitted piece 4000 to reduce the error during fitting. For this reason, the present disclosure provides a following possible implementation for the fitting positioning component 2100.

Figure 6:
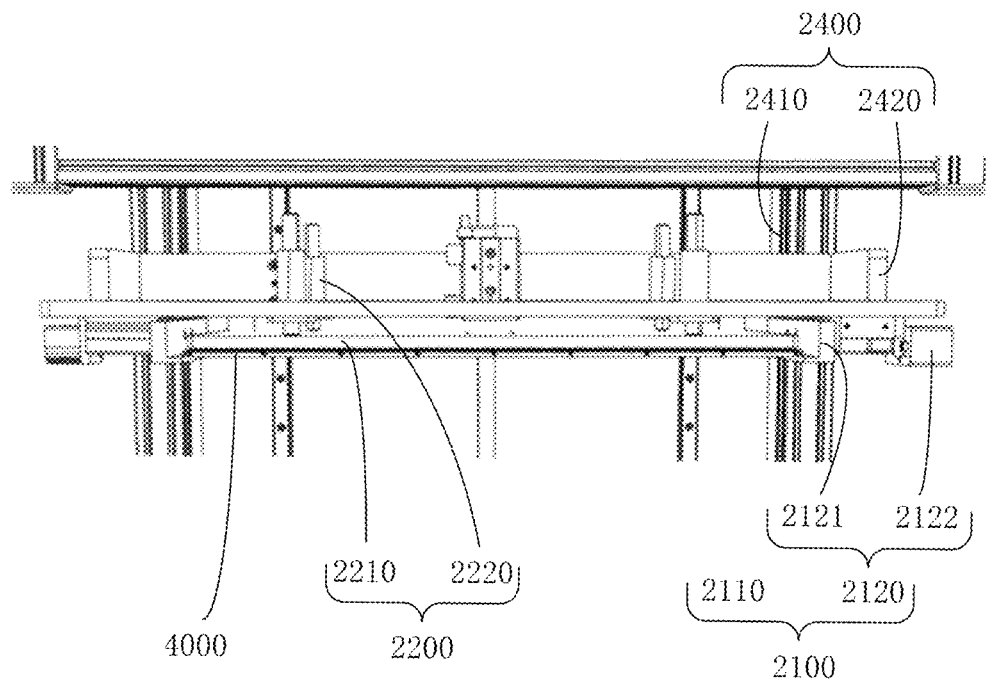
FIG. 6 is a schematic structural diagram of a fitting positioning component and a fitting clamp component of a splicing and fitting device according to an embodiment of the present disclosure.
Figure 7:
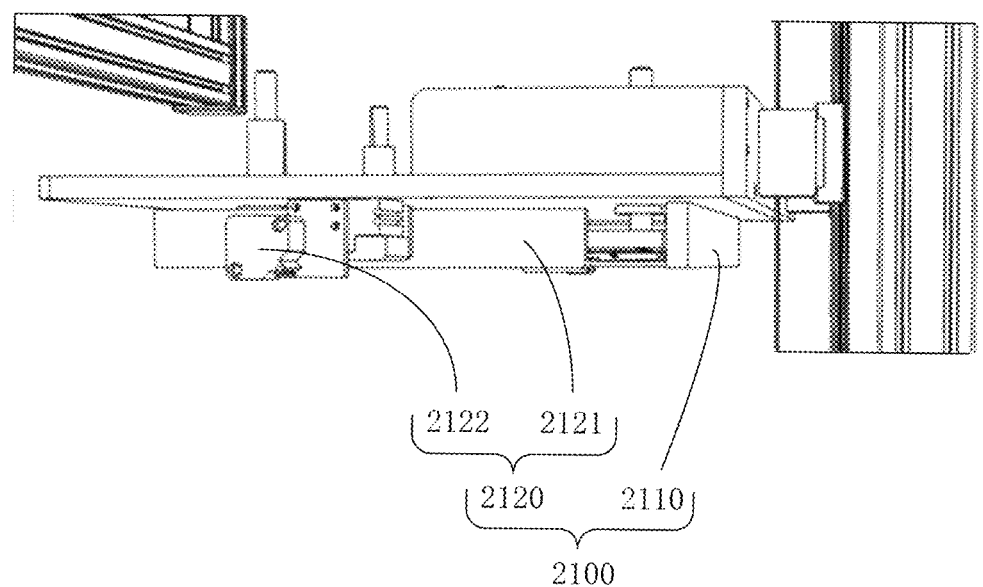
FIG. 7 is a right side view of FIG. 6.

As shown in FIG. 6 and FIG. 7, the fitting positioning component 2100 according to the embodiments of the present disclosure includes: a fixed positioning plate 2110 and a movable positioning component 2120; the movable positioning components 2120 include at least two groups that are arranged opposite to each other and configured for correcting the to-be-fitted piece 4000 relative to a third direction of the second reference site; and each group of the movable positioning component 2120 includes: a movable positioning plate 2121 and a positioning driving mechanism 2122; a fixed part of the positioning driving mechanism 2122 is fixedly connected to the movable bracket 2420, a movable part of the positioning driving mechanism 2122 is drivingly connected to the movable positioning plate 2121, and the movable positioning plate 2121 is of an L shape; and the fixed positioning plate 2110 is fixedly connected to the movable bracket 2420, and the fixed positioning plate 2110 and the movable positioning component 2120 are arranged non-collinearly, and are configured for positioning the to-be-fitted piece 4000 relative to a fourth direction of the second reference site.

The movable positioning plate 2121 of the movable component is designed to be an L shape, which may implement correction of position of the to-be-fitted component 4000, and may also provide support for the to-be-fitted component 4000.

Optionally, the positioning driving mechanism 2122 may be an air cylinder, an oil cylinder, etc., to drive the movable positioning plate 2121 to move in an X direction relative to the second reference site, so that the to-be-fitted piece 4000 is corrected with respect to the X direction of the second reference site.

The fixed positioning plate 2110 implements Y-direction positioning relative to the second reference site of the to-be-fitted component 4000, and the fixed positioning plate 2110 cooperates with the movable positioning component 2120 to achieve correction of the to-be-fitted component 4000 relative to the second reference site. Optionally, the third direction and the fourth direction may be different directions, for example, the third direction is perpendicular to the fourth direction.

Optionally, the second reference site corresponds to the first reference site of the splicing table to cooperate with the fitting operation. Optionally, an orthographic projection of the second reference site on the splicing base 1300 coincides with an orthographic projection of the first reference site on the splicing base 1300.

The inventors of the present disclosure consider that the fitting clamp component 2200 needs immobilize the fitting member 4000 to ensure the accuracy during fitting. For this reason, the present disclosure provides a following possible implementation for the fitting clamp component 2200.

As shown in FIGS. 6 and 7, the fitting clamp component 2200 according to the embodiments of the present disclosure includes: a clamp 2210 and a clamp driving mechanism 2220; the clamp 2210 is configured to immobilize the to-be-fitted piece relative to the clamp 2210, wherein when the to-be-fitted piece 4000 is made of magnetic material, the clamp 2210 is an electromagnetic sucker; and a fixed part of the clamp driving mechanism 2220 is fixedly connected to the movable bracket 2420, and a movable part of the clamp driving mechanism 2220 is drivingly connected to the clamp 2210.

The clamp driving mechanism 2220 is configured to drive the clamp 2210 to move toward the to-be-fitted piece 4000; and the clamp 2210 is configured to immobilize the fitted piece relative to the clamp 2210 by clamping, vacuum adsorption, electromagnetic adsorption, or the like.

The inventors of the present disclosure consider that the fitting driving component 2300 should provide driving force for the movable bracket 2420, so that the movable bracket 2420 and the fitting positioning component 2100 and the fitting clamp component 2200 on the movable bracket 2420 may be close to or far away from the splicing table, so as to implement the fitting of the to-be-fitted piece 4000 and the to-be-spliced piece on the splicing table. For this reason, the present disclosure provides the following possible implementation for the fitting drive component 2300.

As shown in FIG. 5, the fitting driving component 2300 according to the embodiments of the present disclosure includes: a driven wheel 2310, a transmission belt 2320, and a driving source 2330; the transmission belt 2320 is drivingly connected to the movable bracket 2420, and the transmission belt 2320 is arranged along a sliding direction of the movable bracket 2420; and the driven wheel 2310 and the driving source 2330 are drivingly connected to respective two ends of the transmission belt 2320.

Optionally, the driven wheel 2310, the transmission belt 2320, and the driving source 2330 may be replaced with a driving gear, a driving chain and a driving source 2330 whose output end is a gear, which are engaged to provide more accurate driving. It should be appreciated that, the driven wheel 2310, the transmission belt 2320, and the driving source 2330 may also be replaced with a push-pull driving mechanism of an oil cylinder or an air cylinder.

By applying the embodiments of the present disclosure, at least the following beneficial effects may be achieved: (1) the splicing adjustment component 1100 is configured to support the to-be-spliced pieces 3000, and may adjust the gap between the two to-be-spliced pieces 3000 by driving the two adjacent to-be-spliced pieces 3000 to be close to or far away from each other, so as to meet gap requirements of different products and improve compatibility of the splicing device; (2) the splicing alignment component 1200 corrects an initial position of the to-be-spliced piece 3000 supported by the splicing alignment component 1200, so as to reduce the splicing error and maintain the splicing accuracy; (3) the fitting positioning component 2100 is configured to correct the initial position of the to-be-fitted piece 4000 to reduce the error during fitting; (4) the fitting clamp component 2200 is configured to stability immobilize the to-be-fitted piece 4000, so as to ensure the accuracy during fitting; (5) the fitting drive component 2300 is configured to drive the to-be-fitted piece 4000 to complete the fitting action, and cooperate with the guidance of the sliding connection between the movable bracket 2420 and the fixed support 2410 to ensure the stability of the fitting accuracy.

Those skilled in the art can understand that steps, measures and solutions in various operations, methods, processes that have been discussed in the present disclosure can be alternated, changed, combined or deleted. Further, other steps, measures and solutions in various operations, methods and processes that have been discussed in the present disclosure can also be alternated, changed, rearranged, decomposed, combined or deleted. Further, steps, measures, and solutions in various operations, methods and processes in the related art and disclosed in the present disclosure can also be alternated, changed, rearranged, decomposed, combined, or deleted.

In the description of the present disclosure, it should be appreciated that orientations or positional relationships indicated by terms such as "center", "up", "down", "front", "back", "left", "right", "vertical", "horizontal", "top", "bottom", "inside" and "outer" and the like are based on orientations or positional relationships shown in the accompanying drawings, and are only for convenience of describing the present disclosure and simplifying the description, rather than indicating or implying that a device or an element referred to must have a specific orientation, be constructed and operated in a specific orientation, and therefore cannot be understood as limitations on the present disclosure.

The terms "first" and "second" are used for descriptive purposes only, and cannot be understood as indicating or implying relative importance or implicitly indicating the number of indicated technical features. Therefore, features defined as "first" and "second" may explicitly or implicitly include one or more of the features. In the description of the present disclosure, unless otherwise specified, "a plurality" means two or more.

In the description of the present disclosure, it should be noted that the terms "installation", "connection" and "connected" should be understood in a broad sense unless otherwise explicitly stated and defined, for example, they may be fixed connections, detachable connections or integral connections; or they may be direct connections, indirect connections through an intermediate medium, or internal communication between two elements. For those of ordinary skill in the art, specific meanings of the above terms in the present disclosure may be understood according to specific situations.

In the description of this specification, specific features, structures, materials, or features may be combined in an appropriate manner in any one or more embodiments or examples.

It should be understood that although the steps in the flowchart of the accompanying drawings are shown in sequence as indicated by arrows, these steps are not necessarily executed in the order indicated by the arrows. Unless explicitly stated herein, there are no strict restrictions on execution of these steps, and these steps can be executed in other orders. Moreover, at least a part of the steps in the flowchart of the accompanying drawing may include multiple sub-steps or multiple stages, these sub-steps or stages are not necessarily performed at the same time, but may be performed at different times, and may be not necessarily executed sequentially, but may be executed in turn or alternately with other steps or sub-steps of the other steps or at least part of the stages.

The above are merely a part of the embodiments of the present disclosure. It should be noted that those of ordinary skills in the art can make further improvements and modifications without departing from principles of the present disclosure, and these improvements and modifications should also be considered as falling into the protection scope of the present disclosure.

What is claimed is:

1. A splicing structure, comprising: a splicing adjustment component, a splicing alignment component, and a splicing base, wherein
   the splicing adjustment component and the splicing alignment component are respectively connected to the splicing base;
   the splicing adjustment component is configured to support at least two to-be-spliced pieces;
   the splicing alignment component is configured to align the at least two to-be-spliced pieces to a first reference site,
   wherein the splicing adjustment component is further configured to drive at least one of two adjacent to-be-spliced pieces in the at least two to-be-spliced pieces to move relative to the first reference site, to enable the two adjacent to-be-spliced pieces to be close to or far away from each other,
   wherein the splicing alignment component comprises a plurality of alignment units; each of the alignment units comprises: an alignment plate, a first alignment driving mechanism, and a second alignment driving mechanism;
   the alignment plates are arranged around the splicing adjustment component;
   a fixed part of the first alignment driving mechanism is fixedly connected to the splicing base, and a movable part of the first alignment driving mechanism is connected to the alignment plate, to enable the alignment plate to be close to or far away from the to-be-spliced pieces along a first direction; and
   a fixed part of the second alignment driving mechanism is fixedly connected to the movable part of the first alignment driving mechanism, a movable part of the second alignment driving mechanism is fixedly connected to the alignment plate, to enable the alignment plate to be aligned to the first reference site along a second direction.

2. The splicing structure according to claim 1, wherein the splicing adjustment component comprises at least one adjustment unit; and
   each of the at least one adjustment unit comprises a first support, a first sliding support mechanism, and an adjustment driving mechanism;
   the first support is configured to support a corresponding to-be-spliced piece;
   the first sliding support mechanism comprises: a first slider and a first guide rail;
   the first slider and the first guide rail constitute a sliding connection pair, the first slider is fixedly connected to the first support, and the first guide rail is fixedly connected to the splicing base; and
   a movable part of the adjustment driving mechanism is drivingly connected to the first support, and a fixed part of the adjustment driving mechanism is fixedly connected to the splicing base.

3. The splicing structure according to claim 2, wherein the splicing adjustment component further comprises a reference unit; and
   the reference unit is adjacent to the at least one adjustment unit, and the reference unit is configured to support the to-be-spliced piece serving as a splicing reference.

4. The splicing structure according to claim 3, wherein the reference unit is arranged at a predetermined position within a range of the first reference site, and each of the at least one adjustment unit is configured to enable the first support to move relative to the reference unit through the first sliding support mechanism and the adjustment driving mechanism.

5. The splicing structure according to claim 3, wherein the reference unit comprises a second support and a second sliding support mechanism;
   the second support is configured to support the to-be-spliced piece serving as the splicing reference; and
   the second sliding support mechanism comprises: a second slider and a second guide rail; the second slider and the second guide rail constitute a sliding connection pair, the second slider is fixedly connected to the second support, and the second guide rail is fixedly connected to the splicing base.

6. The splicing structure according to claim 5, wherein the first support and the second support are provided with the two adjacent to-be-spliced pieces respectively.

7. The splicing structure according to claim 5, wherein the splicing adjustment component further comprises a plurality of adsorption units;
   each of the adsorption units comprises: a vacuum sucker and a vacuum tube; the vacuum sucker is configured to immobilize the to-be-spliced piece relative to the vacuum sucker;
   and the vacuum tube is configured to communicate the vacuum sucker with a vacuum source;
   each of at least one of the first slider and the second slider is provided with at least one vacuum sucker; and each of at least one of the first support and the second support is provided with a mounting through hole configured to accommodate the vacuum sucker; or
   each of at least one of the first support and the second support is provided with a mounting through hole configured to accommodate the vacuum sucker, and the vacuum sucker is arranged in the mounting through hole.

8. The splicing structure according to claim 1, wherein
each of the alignment plates is configured to be driven by the respective first and second alignment driving mechanisms to push the respective to-be-spliced piece to move, until the respective to-be-spliced piece reaches the first reference site.

9. A splicing and fitting device, comprising: the splicing structure according to claim 1, and a fitting structure, wherein
the fitting structure comprises: a fitting positioning component, a fitting clamp component, a fitting driving component and a bracket;
the bracket comprises a fixed bracket and a movable bracket; the fixed bracket is connected to the splicing base of the splicing structure; and the movable bracket is slidably connected to the fixed bracket;
the fitting positioning component and the fitting clamp component are both connected to the movable bracket;
the fitting positioning component is configured to correct a to-be-fitted piece to be in a second reference site, and the second reference site corresponds to the first reference site;
the fitting clamp component is configured to immobilize the to-be-fitted piece relative to the fitting clamp component; and
the fitting driving component is configured to drive the movable bracket to be close to or far away from the splicing structure.

10. The splicing and fitting device according to claim 8, wherein
the fitting positioning component comprises: a fixed positioning plate and a movable positioning component;
the movable positioning component comprises at least two groups that are arranged opposite to each other and configured to correct the to-be-fitted piece relative to a third direction of the second reference site; and each group of the movable positioning component comprises: a movable positioning plate and a positioning driving mechanism;
a fixed part of the positioning driving mechanism is fixedly connected to the movable bracket, a movable part of the positioning driving mechanism is drivingly connected to the movable positioning plate, and the movable positioning plate is of an L shape; and
the fixed positioning plate is fixedly connected to the movable bracket, and the fixed positioning plate and the movable positioning component are arranged non-collinearly, and are configured to position the to-be-fitted piece relative to a fourth direction of the second reference site.

11. The splicing and fitting device according to claim 9, wherein
the fitting clamp component comprises: a clamp and a clamp driving mechanism;
the clamp is configured to immobilize the to-be-fitted piece relative to the clamp, the to-be-fitted piece is made of magnetic material, and the clamp is an electromagnetic sucker; and
a fixed part of the clamp driving mechanism is fixedly connected to the movable bracket, and a movable part of the clamp driving mechanism is drivingly connected to the clamp.

12. The splicing and fitting device according to claim 9, wherein
the fitting driving component comprises: a driven wheel, a transmission belt, and a driving source;
the transmission belt is drivingly connected to the movable bracket, and the transmission belt is arranged along a sliding direction of the movable bracket; and
the driven wheel and the driving source are drivingly connected to respective two ends of the transmission belt.

13. A splicing and fitting device, comprising: the splicing structure according to claim 2, and a fitting structure, wherein
the fitting structure comprises: a fitting positioning component, a fitting clamp component, a fitting driving component and a bracket;
the bracket comprises a fixed bracket and a movable bracket; the fixed bracket is connected to the splicing base of the splicing structure; and the movable bracket is slidably connected to the fixed bracket;
the fitting positioning component and the fitting clamp component are both connected to the movable bracket;
the fitting positioning component is configured to correct a to-be-fitted piece to be in a second reference site, and the second reference site corresponds to the first reference site;
the fitting clamp component is configured to immobilize the to-be-fitted piece relative to the fitting clamp component; and
the fitting driving component is configured to drive the movable bracket to be close to or far away from the splicing structure.

14. The splicing and fitting device according to claim 13, wherein
the fitting positioning component comprises: a fixed positioning plate and a movable positioning component;
the movable positioning component comprises at least two groups that are arranged opposite to each other and configured to correct the to-be-fitted piece relative to a third direction of the second reference site; and each group of the movable positioning component comprises: a movable positioning plate and a positioning driving mechanism;
a fixed part of the positioning driving mechanism is fixedly connected to the movable bracket, a movable part of the positioning driving mechanism is drivingly connected to the movable positioning plate, and the movable positioning plate is of an L shape; and
the fixed positioning plate is fixedly connected to the movable bracket, and the fixed positioning plate and the movable positioning component are arranged non-collinearly, and are configured to position the to-be-fitted piece relative to a fourth direction of the second reference site.

15. The splicing and fitting device according to claim 13, wherein
the fitting clamp component comprises: a clamp and a clamp driving mechanism;
the clamp is configured to immobilize the to-be-fitted piece relative to the clamp, the to-be-fitted piece is made of magnetic material, and the clamp is an electromagnetic sucker; and
a fixed part of the clamp driving mechanism is fixedly connected to the movable bracket, and a movable part of the clamp driving mechanism is drivingly connected to the clamp.

16. A splicing structure, comprising: a splicing adjustment component, a splicing alignment component, and a splicing base, wherein the splicing adjustment component and the splicing alignment component are respectively connected to the splicing base;

the splicing adjustment component is configured to support at least two to-be-spliced pieces;

the splicing alignment component is configured to align the at least two to-be-spliced pieces to a first reference site, wherein the splicing adjustment component is further configured to drive at least one of two adjacent to-be-spliced pieces in the at least two to-be-spliced pieces to move relative to the first reference site, to enable the two adjacent to-be-spliced pieces to be close to or far away from each other, the splicing adjustment component comprises at least one adjustment unit; and each of the at least one adjustment unit comprises a first support, a first sliding support mechanism, and an adjustment driving mechanism;

the first support is configured to support a corresponding to-be-spliced piece;

the first sliding support mechanism comprises: a first slider and a first guide rail;

the first slider and the first guide rail constitute a sliding connection pair, the first slider is fixedly connected to the first support, and the first guide rail is fixedly connected to the splicing base; and a movable part of the adjustment driving mechanism is drivingly connected to the first support, and a fixed part of the adjustment driving mechanism is fixedly connected to the splicing base, the splicing adjustment component further comprises a reference unit; and the reference unit is adjacent to the at least one adjustment unit, and the reference unit is configured to support the to-be-spliced piece serving as a splicing reference;

wherein the reference unit comprises a second support and a second sliding support mechanism;

the second support is configured to support the to-be-spliced piece serving as the splicing reference; and the second sliding support mechanism comprises: a second slider and a second guide rail; the second slider and the second guide rail constitute a sliding connection pair, the second slider is fixedly connected to the second support, and the second guide rail is fixedly connected to the splicing base, the splicing adjustment component further comprises a plurality of adsorption units;

each of the adsorption units comprises: a vacuum sucker and a vacuum tube; the vacuum sucker is configured to immobilize the to-be-spliced piece relative to the vacuum sucker;

and the vacuum tube is configured to communicate the vacuum sucker with a vacuum source;

each of at least one of the first slider and the second slider is provided with at least one vacuum sucker; and each of at least one of the first support and the second support is provided with a mounting through hole configured to accommodate the vacuum sucker; or each of at least one of the first support and the second support is provided with a mounting through hole configured to accommodate the vacuum sucker, and the vacuum sucker is arranged in the mounting through hole.

* * * * *